United States Patent
Barskiy et al.

(10) Patent No.: US 6,205,412 B1
(45) Date of Patent: *Mar. 20, 2001

(54) METHODS IN COMPUTER SIMULATION OF TELEPHONY SYSTEMS

(75) Inventors: Michail D. Barskiy, San Francisco; Yuri Ostapchuk, San Mateo; Boris Livshits; Hamid R. Dadgar, both of San Bruno, all of CA (US)

(73) Assignee: Genesys Telecommunications Laboratories, Inc., San Francisco, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,675

(22) Filed: Sep. 9, 1997

(51) Int. Cl.[7] ............................ G06F 17/50; G06F 15/173
(52) U.S. Cl. ................................. 703/13; 709/226
(58) Field of Search ...................... 364/578; 395/500.34; 703/13; 709/226

(56) References Cited

U.S. PATENT DOCUMENTS

| | | | |
|---|---|---|---|
| 5,359,649 | * | 10/1994 | Rosu et al. ............................ 379/220 |
| 5,384,771 | * | 1/1995 | Isidoro et al. ........................ 370/254 |
| 5,440,719 | * | 8/1995 | Hanes et al. ..................... 395/500.34 |
| 5,598,532 | * | 1/1997 | Liron ................................ 395/500.23 |
| 5,706,453 | * | 1/1998 | Cheng et al. ......................... 345/347 |
| 5,715,432 | * | 2/1998 | Xu et al. ........................... 395/500.34 |
| 5,809,282 | * | 9/1998 | Cooper et al. .................... 395/200.56 |
| 5,838,768 | * | 1/2000 | Sumar et al. ....................... 379/88.14 |
| 5,870,464 | * | 2/1999 | Brewster et al. ...................... 379/219 |
| 5,892,764 | * | 4/1999 | Riemann et al. ...................... 370/401 |
| 5,917,898 | * | 6/1999 | Bassa et al. .......................... 379/133 |
| 6,012,152 | * | 1/2000 | Douik et al. ........................... 714/26 |

OTHER PUBLICATIONS

OPNET; numbered pp. 1–11 (obtained from www.mil3.com)—package ordered, 1993.*

(List continued on next page.)

*Primary Examiner*—Kevin J. Teska
*Assistant Examiner*—Hugh Jones
(74) *Attorney, Agent, or Firm*—Donald R. Boys; Central Coast Patent Agency

(57) ABSTRACT

A computer simulation system adapted for simulating a telephony call center comprises individual software modules simulating separate entities of the call center in the simulated call center, and a graphical user interface (GUI). In the GUI the individual software modules are presented as icons movable and connectable on the screen to alter characteristics of the simulated call center. In a preferred embodiment the simulation system is adapted for testing computer telephony integration (CTI) applications. In this embodiment one of the software module icons comprises a (CTI) link interface library adapted to provide communication between the simulated call center and the CTI application in a manner that the simulated call center will behave as a specific switch type in a specific instance. Also in a preferred embodiment one of the individual software modules is a telephony objects module representing a telephony switch and connected telephony devices, agents, and associated behavior. In this aspect individual telephony objects are represented in the GUI as icons that may be selected and added to or subtracted from the telephony objects module to alter the behavior repertoire of the module.

9 Claims, 1 Drawing Sheet

Figure 1:
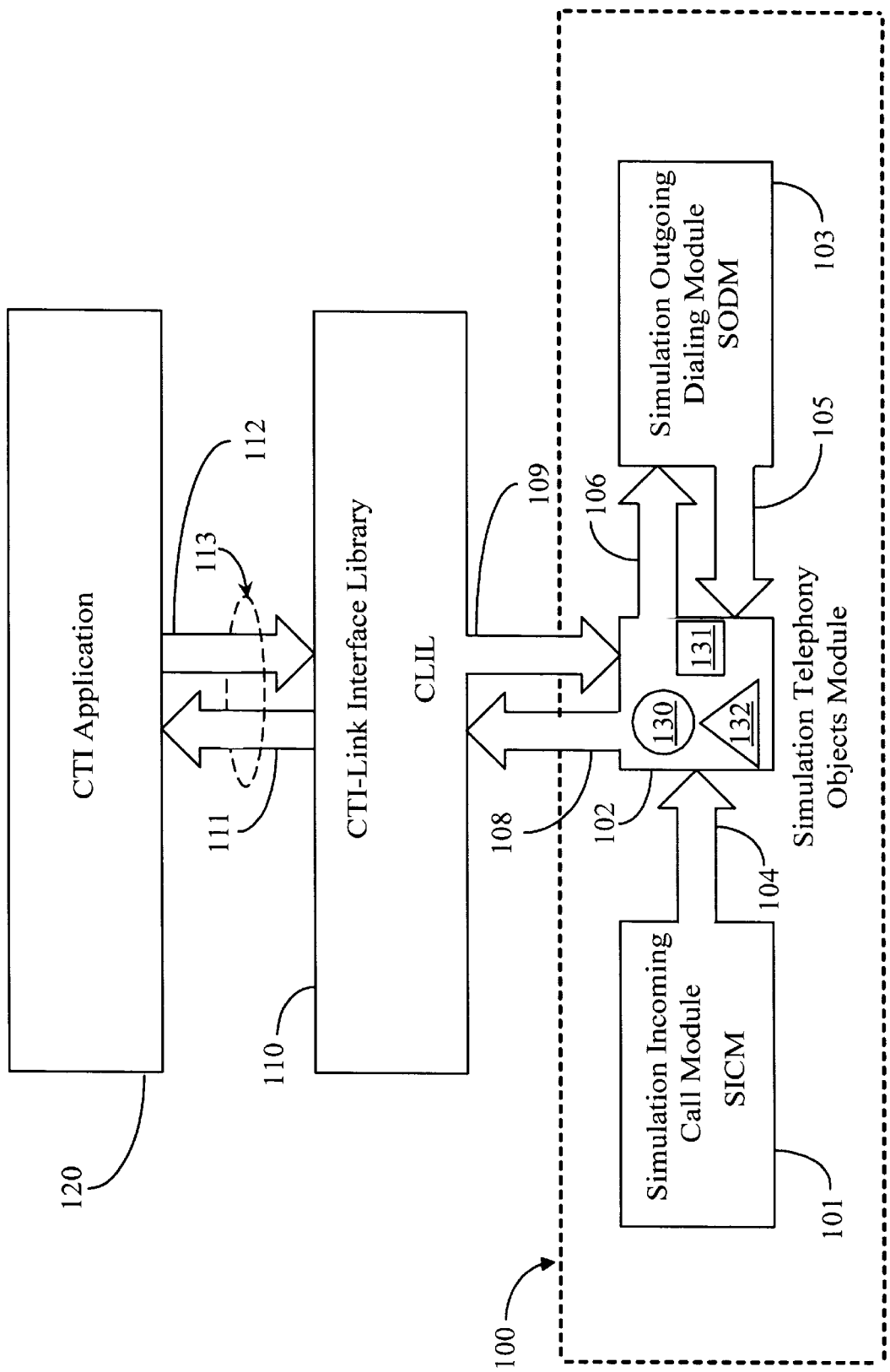

OTHER PUBLICATIONS van Zijl et al: A tool for graphical network modeling and analysis; IEEE Software; pp. 47–54, 1992.*

COMNET III: product description; (obtained from www.caciasl.com/COMNET); pp. 1–9, 1995.*

Bachmann et al.: NetMod: a design tool for large–scale heterogeneous campus networks; IEEE J. Selected Areas in Communications; pp. 15–24, 1991.*

Vazquez et al.: Graphical interface for communication network analysis: IEEE Proc. Electrotechnical Conf.; pp. 1109–1112, 1991.*

Chan et al.: Interactive network planning and analysis on a computer; IEEE Computer applications in power, pp. 43–47, 1990.*

Lin et al.: A flexible graphical user interface for performance modeling; IEEE MASCOTS '94; pp. 193–199, 1993.*

Microsoft Computer Dictionary: pp. 162–163, 1991.*

* cited by examiner

METHODS IN COMPUTER SIMULATION OF TELEPHONY SYSTEMS

FIELD OF THE INVENTION

The present invention is in the area of telephone call processing and switching, including intelligent call center systems, and pertains more particularly to Computer Telephony Integration (CTI) with such systems, and to equipment and methods for computer simulation of new developments for such systems, allowing testing, demonstration and debugging to be done without resort to real systems.

BACKGROUND OF THE INVENTION

Telephone call processing and switching systems, including call centers of many sorts and having varied architecture, are, at the time of the present patent application, relatively sophisticated, computerized systems. Development and introduction of new systems continues at a rapid pace in an attempt to keep pace with heated demand. Much information on the nature of such telephone hardware and software is available in a number of publications accessible to the present inventor and to those with skill in the art in general. For this reason, much minute detail of known systems is not reproduced here, as to do so would obscure the descriptions of the inventive subject matter.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing and call center systems, and in computer integration applied to such systems. Many such systems are known to the present inventor and many have been patented. More and better systems are being developed at the time of the present application, and the present patent application pertains most particularly to methods for simulating telephony systems and CTI with such systems as an aid in development and testing of systems with new and enhanced functionality.

There are many, many different arrangements of equipment for providing telephony and call center functions, and many more functions that may be provided by CTI. There are also, however, a number of commonalties among such systems. For example, all call centers employ some sort of telephony switch for receiving and routing telephone calls. Such switches are made by a number of manufacturers, and, generally speaking, all such switches can function at some level with telephone communication from one to another. That is, a switch from one manufacturer at one location will function with a switch from another manufacturer at another location.

Even though different types and manufacture of switches may operate in conjunction with one another, it is also true that enhanced functionality provided with one switch from one manufacturer may not be operable through a switch from another manufacturer. For this reason, CTI has taken on added importance as a means to provide greatly enhanced functionality, and also, in some instances as a means to integrate different types of switches in advanced systems.

In CTI, typically, given a switch in a system of interest, integration is accomplished by connecting a relatively powerful processor by what is known as a CTI link to the switch, and executing applications on the added processor. The applications can be of many and varied sorts, providing enhanced agent-level routing, for example, and the use of relatively sophisticated databases with telephone switching. Typically, data received with a telephone call at a CTI-enhanced switch may be provided to the CTI processor, and used in a variety of ways. Also typically, after functional manipulation, the CTI processor may command the switch in its various functions, such as routing incoming calls to agents at stations connected by lines having directory numbers. Calls may also be queued, rerouted, routed to remote destinations through dialing functions, and so forth.

Given the relative sophistication of telephony systems, particularly with CTI, the proliferation of switches and other hardware from different manufacturers, and a great demand presently experienced for faster and better systems with new functions, there is a serious impediment to rapid development. This impediment is the need to test new systems, which are in the main software enhancements, in many and varied situations. For example, having developed a new application to run on a CTI processor to serve and command a telephony switch, the developer needs to test and debug the new application in widely varied circumstances. Given the nature of hardware for such systems testing and debugging can become an expensive nightmare requiring arranging and rearranging hardware platforms and software applications to provide the extreme range of conditions that must be tested to be sure a new application may be released with a reasonable expectation of success.

What is clearly needed is method and apparatus which allows a developer to simulate switching and call center systems over a broad range of variables, and to simulate as well a CTI interface for connecting the CTI processor with the simulated system. Such a simulation ability needs to be provided in a way that variables may be easily and conveniently manipulated for thorough testing and debugging of CTI applications.

SUMMARY OF THE INVENTION

In a preferred embodiment of the present invention a computer simulation system adapted for simulating a telephony call center is provided, comprising individual software modules simulating separate entities of the call center in the simulated call center; and a graphical user interface (GUI). In the GUI the individual software modules are presented as icons movable and connectable on the screen to alter characteristics of the simulated call center.

The computer simulation system in embodiments of the invention may be used for testing computer telephony integration (CTI) applications wherein one of the software module icons comprises a (CTI) link interface library adapted to provide communication between the simulated call center and the CTI application in a manner that the simulated call center will behave as a specific switch type in a specific instance. In this aspect one of the individual software modules is a telephony objects module representing a telephony switch and connected telephony devices, agents, and associated behavior. Individual telephony objects are represented in the GUI as icons that may be selected and added to or subtracted from the telephony objects module to alter the behavior repertoire of the module. The telephony objects may comprise any features of telephony switches.

In preferred embodiments telephony objects are associated with one or more editing fields allowing a user to edit parameters for the object module. In this aspect a multiplicity parameter may be edited to provide for multiple instances of a selected module in a simulation. Also, the behavior of multiple instances of a single object module may be randomized in operation.

The system of the present invention provides for the first time an ability, by object-oriented programming, to simulate a broad variety of telephony equipment and to test enhancing computer applications against such simulated equipment, and the variety and configuration of switches and other characteristics of call centers can be quickly and easily changed.

BRIEF DESCRIPTION OF THE DRAWING FIGURE

FIG. 1 is a block diagram depicting a simulated system according to a preferred embodiment of the present invention.

DESCRIPTION OF THE PREFERRED EMBODIMENTS

The present invention pertains to computer simulation of telephony call centers and activity and functionality of such centers, and to computer telephony integration (CTI) as applied to such centers, as has been described briefly in the background section above. It is well-known in the art that call center architecture and functionality is a rich and varied subject, and it is beyond the scope of the present specification to describe all of the rich variation in call center technology. There are, however, commonalties. Every call center, for example, is centered on a telephony switch, either at a customer's premises or provided by a telephone company. The telephony switch involved in a call center typically has one or more incoming trunks of telephone channels for receiving telephone calls, and typically one or more outgoing trunks as well, for placing calls back into the network.

Also common to call centers is the fact of connections to telephones at agent stations, which are typically assigned directory numbers. There may be just a few, dozens or even thousands of agent stations controlled by a single call center. In some call centers, only telephones are provided at agent stations. In others there may be computer terminals with display monitors, and the computer terminals may be interconnected on a local area network (LAN) along with network servers of various sorts. Call centers have recently been developed for providing video conferencing with agents. It may be seen that the architecture can be quite varied.

Telephone switches at call centers, depending on the model and manufacture, are capable of certain functions in switching, such as Automatic Call Distribution (ACD), queuing, playing recorded announcements to callers, and much more, and typically the functions available, and the manner in which the functions operate is specific to the make and model of the telephony switch.

In addition to all of the above, the systems of interest for the present invention are systems having a CTI link capability, enabling connection of a processor executing one or more usually customer-specific applications. According to the reference incorporated above, CTI involves three areas: (1) Call Control, which includes an ability to control and observe telephony calls, switching features and status, automatic call distribution (ACD) systems and ACD agents, and to use switching resources including tone generators and detectors; (2) Telephone Control, which is an ability to control and observe telephone devices; and (3) Media Access, which includes binding telephone calls to other media services.

In accomplishing the observation and control functions of CTI as listed above, applications executed on a CTI processor can be quite varied in function, really limited only to the imagination of application developers, and presently include such functions as agent-level routing, which will be familiar to those with skill in the art.

FIG. 1 is a block diagram depicting a simulated system according to a preferred embodiment of the present invention. In FIG. 1, boundary 100 encloses software modules that emulate a call center and associated objects; boundary 110 represents a unique CTI Link Interface Library (CLIL); and boundary 120 represents a CTI application. Each of the three broad elements introduced here is described in further detail below.

In simulating a call center and associated elements as represented in FIG. 1 by group 100, it is necessary to simulate both physical and logical elements. These include, but are not necessarily limited to (a) agents telephones and stations, (b) ACD, (c) ACD groups, (d) ACD queues, (e) incoming trunks, (f) outgoing trunks, (g) abstractions of communication relationship between one or more devices, and (h) communication with user applications.

In the example of FIG. 1, call center group 100 comprises a software module 101, termed a Simulated Incoming Call Module (SICM), which emulates incoming calls via one or more trunks 104 to a switch 102. The SICM operates with an ACD list, and simulates calls to ACD groups.

Switch 102 is termed in embodiments of the invention a Simulated Telephony Objects Module (STOM), and comprises a variety of micro-emulated objects represented here by elements 130–132, which represent such as agents, ACD queues, and the like, as listed above.

Agent's telephones and agent stations as micro-emulated objects in a call center simulation will have attributes and statuses including, but not necessarily limited to two-line connections; perhaps a group relationship; and an equipment configuration mode (status when call offered, and status when call released).

Other entities that may become micro-emulated objects in a call center module, as represented by elements 130–132 include such as an Interactive Voice Response (IVR)system, remote access agents, media services that may appear in a call center switch, and generally, any feature that a call center switch can perform. Outgoing trunks have parameters including but not limited to a list of the outgoing trunks and a probability of answer result, such as answer, not answer, busy, answering machine, fax/modem, SIT tones, and so forth.

Calls in the simulation procedure have attributes and parameters including but not limited to origination party; destination party; PBX call identifier, DNIS number, ANI, and call status, such as connecting, waiting, alerting, or conferencing.

Elements 130–132, represented here as icons, may be, as indicated above, any function or behavior associated with STOM 102, and it will be apparent to those with skill in the art that the three elements shown are not enough to depict all physical and logical elements that would have to be provided for STOM 102 to make a realistic simulation. The elements shown, however, will be sufficient to teach to practice of the invention to those with skill in the art.

Software module 103 represents an outgoing and return module, termed a Simulated Outgoing Dialing Module (SODM), wherein calls placed by STOM 102 over path 106 are modeled, and calls returned as a function of the outgoing calls over path 105 are also modeled. STOM 102 communicates with Interface Library 110 via paths 108 and 109. Link 113 represents a CTI link from application 120 to switch 102 via CLIL 110.

The STOM notifies an application 120 through CLIL 110 of arriving calls, and data associated with arriving calls, as well changing status of telephony objects and statuses. STOM 102 receives requests from application 120 via CLIL 110 to change status of agents phones and stations, such as login, logout, ready, not ready, or and busy. Requests are also received to change call status, such as answer, reconnect, disconnect, produce new call, transfer call, and include a call to a conference. If requested changes are available the STOM produces the changes and sends notification o the changes to application 120 through CLIL 110. If requested changes are not available, negative notification is sent.

In the embodiment of the invention illustrated by FIG. 1, although several computer functions are represented that may in a real system, rather than an emulated system, be executed on separate but connected and intercommunicating processors, all of the system represented by FIG. 1 will be typically executed on a single, relatively powerful computer. The various elements represented are software modules written to intercommunicate, and to simulate the behavior of real telephony systems.

FIG. 1 is more than a block diagram representing a system of the invention. FIG. 1 also represents a user interface wherein the elements are objects represented on a graphical user interface (GUI) as icons. The system of the invention is adapted such that object elements may be selected from a library and interchanged into an interconnected system.

As an example of the object-oriented nature of the GUI of FIG. 1, attention is directed to SICM 101. This software module is a micro-application that, when initiated and operating may simulate calls to STOM 102. A master SICM is developed that includes all of the characteristics of incoming calls. The master module has input parameters that allow a user to configure the module for certain behavior of interest. As an example, it may be of interest to test an application running as element 120 against a rush of Christmas shoppers placing calls within a certain time frame at a certain rate, with the calls statistically distributed for a range of products for which agents at the emulated call center are adapted to enter orders and schedule deliveries.

The matter of importance in describing this invention is not the particular nature or statistical distribution of the calls, but the fact that the module has alterable parameters, also known as properties, which a user may manipulate to represent behavior of interest, and that the module is adapted to the system as an object, which may be removed and replaced by another object having a different parameter set. One may then quickly and conveniently alter the incoming conditions for a simulation, and new modules with different parameter sets may be developed off line and switched into the system.

Attention is now directed to STOM 102. Iconic elements 130–132 are shown as three different shapes in FIG. 1. Each of these elements is a micro emulated object having alterable parameters. Description of an agent object should be adequate to illustrate the nature of the invention in this aspect.

Consider that element 130 is a micro emulated agent module. This module may be selected from a library in the fashion described above for the SICM module, and dragged and dropped into switch 132. Either before or after addition to the switch, parameters for the module may be accessed and set. It will be apparent to those with skill in the art that there may be a large number of agents assigned to a single call center, and that all of the agents may not have the same assignments or characteristics.

As an example of the versatility of the unique system, there may be, for example, agents for English speakers who call, and agents who speak Spanish for handling calls from Spanish-speaking customers. Certain agents may be trained for certain functions: to sell certain products, for example, or to provide technical assistance in certain situations. There may be, however, multiple instances of a micro-emulated agent. For example, of a Spanish-speaking agent assigned to first shift duty and trained to sell three specific related products. An icon represented agent, then, will have a multiplicity parameter. In setting up a simulation a user may select an agent, set certain parameters, then set the multiplicity parameter so that the call center will behave as though there were, say, twenty such agents.

It will be apparent to those with skill in the art that there are several ways parameters may be accessed and set for a micro-emulated object, such as element 130, which may, for example, represent an agent having particular attributes. In one embodiment, for example, a selected icon representing a micro-emulated object may be caused to display an associated window in the GUI, and the window will have programming fields wherein a user may access and alter (edit) parameters. If the object is an agent, there may be, for example, a parameter field for language, for product knowledge, for shift assignment, and so forth; and, as indicated above, there may also be a parameter for multiplicity. If a simulated agent having a complete set of behavior parameters is to be represented multiple times in a call center simulation, the multiplicity parameter may be set for "n" instances, then the object will behave in operation of the simulation as "n" objects. The behavior of such objects can be in preferred embodiments, randomized, so the behavior, where there is a range, is not always the statistical average.

For example, even though there may be multiple instances of an agent with a certain characterization, it will never be true that every such agent will behave in exactly the same way. Some of the agents may habitually come late or leave early, and others may take longer than others for processing after calls are released. In an aspect of the invention such variations are accounted for by access to a statistical database and random generator. Typically the statistical average behavior of all such agents will be known, and may be stored in a manner to be accessible to the system. Multiple agents, otherwise identical in behavior, are caused to randomly alter their behavior in a way that the statistical average behavior is met.

It will be apparent to those with skill in the art that the above description of agent functionality and variation, and the method of applying parameters, multiplicity, and statistical behavior is not necessarily limiting in the invention. Many variations are possible, even including programming an individual module for each an every agent in a setup of interest.

Attention is now directed to CLIL 110 and communication between STOM 102 and CLIL 110. CLIL is an interface library whose function it is to translate between STOM 102 and application 120 in a particular manner. STOM 102 is configured in a manner that will be common to any of the several makes and models of available telephony switches currently available. Different makes and models of telephony switches communicate with CTI applications in different ways, however, and provide significantly different behavior specific to a particular make and model of switch. Communication may also be characterized by latency considerations. For example, in some real world situations one might wish to test, the telephony switch will be on the customer's premises, and in others, the telephony switch might be in the network, remote from the customer's premises. Latency issues in communication will differ by the different switch location, even with the same physical switch.

CLIL is a switch-dependent layer that controls communication of commands and status over data paths 108/109 and CTI link 113. The function of CLIL 110 is to add switch dependent characteristics to the communication, so one simulated generic call center can be made to appear to a CTI application as a particular make and model of a switch connected in a specific manner. The particular value of CLIL 110 is that an application may be tested against one make and model of a switch, and, by selecting a different layer of software from CLIL 110, one may then test the same CTI application against a different make and model of switch and/or location and connectivity of a switch user may quickly and conveniently substitute one CLIL setup for another for communication with a switch of interest.

It will be apparent to those with skill in the art that there may be many alterations in the embodiments described without departing from the spirit and scope of the invention. Many such alterations have already been described. Others include many variations in the GUI presented to a user. Icons can take many forms, and many selection and connectivity schemes may be used in the object oriented programming accomplished. There are similarly many other alterations that may be made. The scope of the invention is limited only by the claims which follow.

What is claimed is:

1. A computer simulation system simulating a telephony call center, comprising:

Computer Telephony Integration (CTI) application software modules comprising a CTI link interface library;

telephony objects software modules representing physical and logical characteristics of a telephony switch, CTI servers, and human behavioral models of agents and connected telephony devices;

micro-emulated software modules corresponding to the CTI application software module and the telephony objects software module, having physical, logical and behavioral characteristics of those modules, including varying human behavioral characteristics of the agents; and a graphical user interface (GUI);

wherein in the GUI the individual software modules are presented as icons movable, connectable, and configurable by the user on the screen to emulate different functions of elements, characteristics and behavior, including the human behavior of the simulated call center based upon the interaction of the CTI application software modules when connected to the telephony objects software modules.

2. The simulation system of claim 1 wherein the telephony objects module includes a telephony switch and connected telephony devices, agents, and associated behavior, and wherein individual telephony objects are represented in the GUI as icons that may be selected and added to or subtracted from the telephony objects module to alter the behavior repertoire of the module.

3. The simulation system of claim 2 wherein individual telephony objects represented by icons comprise any features of telephony switches.

4. The simulation system of claim 3 wherein the individual telephony objects comprise, agents, automatic call destination (ACD) protocols, CTI servers, agent's telephones, and non-telephone equipment at agent's stations.

5. The simulation system of claim 3 wherein a telephony object is associated with one or more editing fields allowing a user to edit parameters for the object module, including human behavior.

6. The simulation system of claim 5 wherein a multiplicity parameter may be edited to provide for multiple instances of a selected module in a simulation.

7. The simulation system of claim 6 wherein the behavior of multiple instances of a single object module may be randomized in operation.

8. The micro-emulated software modules of claim 1 wherein one of the editable parameters allows the user to set a number to provide multiplicity of the object module in a computer simulation.

9. A method for testing a Computer Telephony Integration (CTI) software application, comprising steps of:

(a) simulating a call center including a telephony objects software module having micro-emulated software modules representing physical and logical characteristics of a telephony switch and human behavioral models of agents in a call center in a graphical user interface (GUI);

(b) presenting the telephony objects software module, and the micro-emulated module as icons in the GLI as movable, connectable and configurable by a user;

(c) connecting the telephony objects software module, and micro-emulated modules in the simulated call center and the CTI application through a software interface library, wherein the interface library conditions the communication to emulate a telephony switch of a specific make and model, and the characteristics of the simulated call center are altered based upon the connection of the CTI application to the telephony objects software module.

* * * * *

UNITED STATES PATENT AND TRADEMARK OFFICE
CERTIFICATE OF CORRECTION

PATENT NO. : 6,205,412 B1  
DATED : March 20, 2001  
INVENTOR(S) : Myhailo Barskyy et al.

It is certified that error appears in the above-identified patent and that said Letters Patent is hereby corrected as shown below:

<u>Title page,</u>  
Item [76] "Inventor" should read: Myhailo Barskyy, San Francisco;  
Yuri Ostapchuk, San Mateo;  
Boris Livshits; Hamid R. Dadgar, both of San Bruno, all of CA (US)

Item [22] "Filed" should read: Jul. 9, 1997

Signed and Sealed this

Sixteenth Day of October, 2001

*Attest:*

NICHOLAS P. GODICI  
*Attesting Officer*    *Acting Director of the United States Patent and Trademark Office*